United States Patent [19]

Sasaki et al.

[11] 4,413,424

[45] Nov. 8, 1983

[54] AZIMUTH DETERMINATING APPARATUS

[75] Inventors: Hiroaki Sasaki, Chiryu; Testuya Inoue, Kariya; Yoshiharu Mineo, Kariya; Sei Iguchi, Kariya; Kazuhide Makita, Nagoya; Hiroshi Arai, Toyota; Hajime Itoh, Aichi; Hisatoshi Ohta, Toyota; Masahiro Inazu, Toyota; Akira Kawahashi, Toyota, all of Japan

[73] Assignees: Nippondenso Co., Ltd., Kariya; Toyota Jidosha Kogyo Kabushiki Kaisha, Toyota, both of Japan

[21] Appl. No.: 312,075

[22] Filed: Oct. 16, 1981

[30] Foreign Application Priority Data

Oct. 20, 1980 [JP] Japan .......................... 55-150199[U]

[51] Int. Cl.³ ...................... G01C 17/30; G01R 33/02
[52] U.S. Cl. ....................................... 33/361; 33/356; 33/363 Q
[58] Field of Search ............... 33/361, 363 N, 363 L, 33/363 R, 363 Q, 355, 349, 351, 352, 360, 357, 356

[56] References Cited

U.S. PATENT DOCUMENTS

| 2,426,470 | 8/1947 | Sinks | 33/363 Q |
| 2,593,902 | 4/1952 | Lee | 33/363 Q |
| 3,253,342 | 5/1966 | Depp | 33/356 |
| 3,744,312 | 7/1973 | Anderson | 33/356 |
| 3,905,121 | 9/1975 | Takeda et al. | 33/361 |
| 3,959,889 | 6/1976 | Thomas | 33/363 R |

Primary Examiner—Willis Little
Attorney, Agent, or Firm—Cushman, Darby & Cushman

[57] ABSTRACT

An azimuth determinating apparatus wherein the azimuth sensor is oriented to a specified direction, and the deviation of the two-component detection signals of the azimuth sensor from the pointing direction of the azimuth sensor are corrected by the adjustment of the two-component detection signals with the adjusting circuit in accordance with the indication on the amount of deviation indicated by the indicating circuit, whereby distortion of the output signals due to the residual magnetism of the azimuth sensor is corrected and the true azimuth can be determined.

2 Claims, 11 Drawing Figures

AZIMUTH DETERMINATING APPARATUS

BACKGROUND OF THE INVENTION

The present invention relates to an azimuth determinating apparatus for determining the heading of a moving body such as, for example, a vehicle.

In the apparatus for determining the azimuth basing on the output signal from an azimuth sensor placed in the terrestrial magnetism, it has been proposed compensating magnets attached to the outside of the azimuth sensor for compensating the distortion of the output signal caused by a residual magnetism of the azimuth sensor.

In such conventional arrangement, however, various factors such as the number of compensating magnets, their fitting position and the intensity of magnetism must be considered, resulting in a complex implementation for compensation. In addition, each azimuth sensor needs a different compensation, since each sensor has a different characteristic of output distortion.

SUMMARY OF THE INVENTION

In view of the foregoing problems, it is an object of the present invention to provide an azimuth determinating apparatus capable of determining the true azimuth by compensating the output distortion of the azimuth sensor caused by the residual magnetism of the sensor in such a way that the azimuth sensor is oriented to the specified direction and the deviation of the two-component detection signal of the sensor from the specified direction is corrected through the adjustment of the two-component detection signal on the adjustment circuit in accordance with the deviation indicating circuit.

DESCRIPTION OF THE PREFERRED EMBODIMENT

Figure 1:
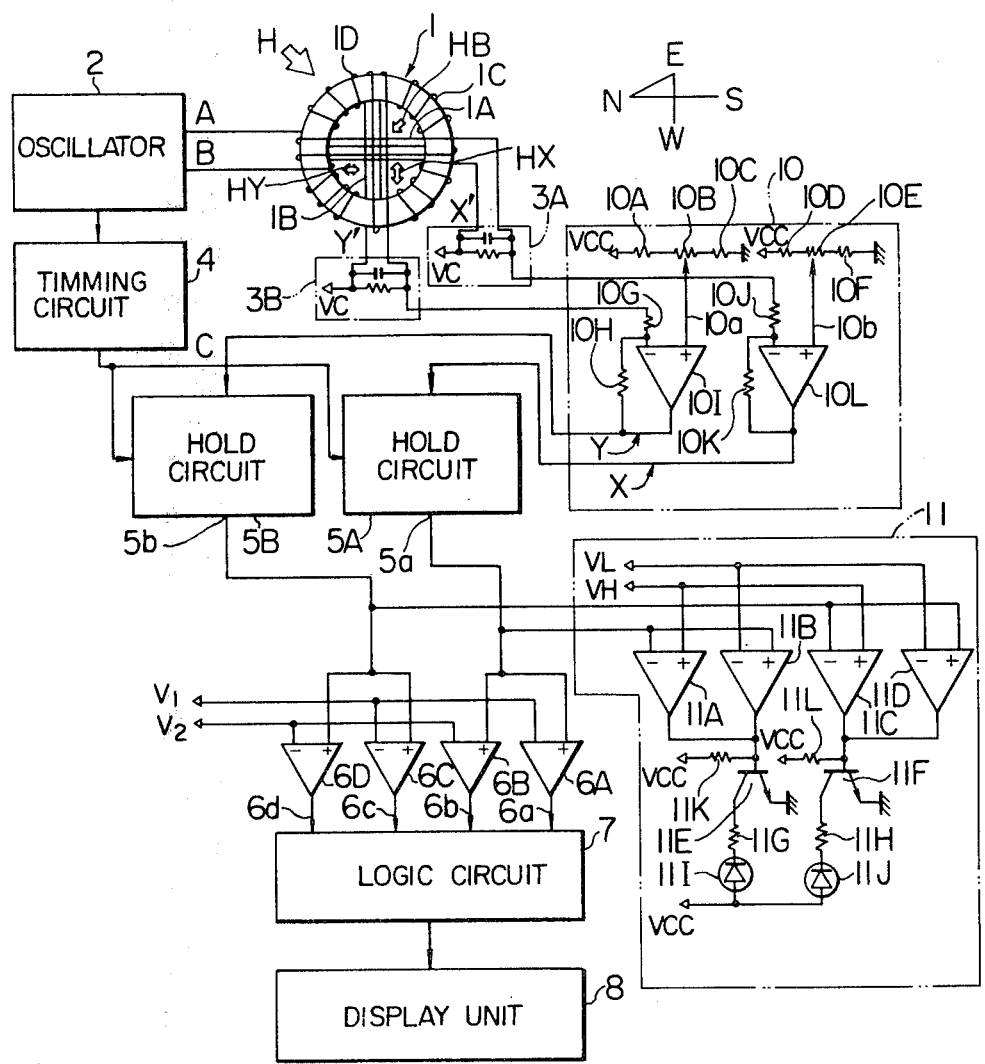
FIG. 1 is a general systematic diagram illustrating an embodiment of the present invention.
Figure 2:
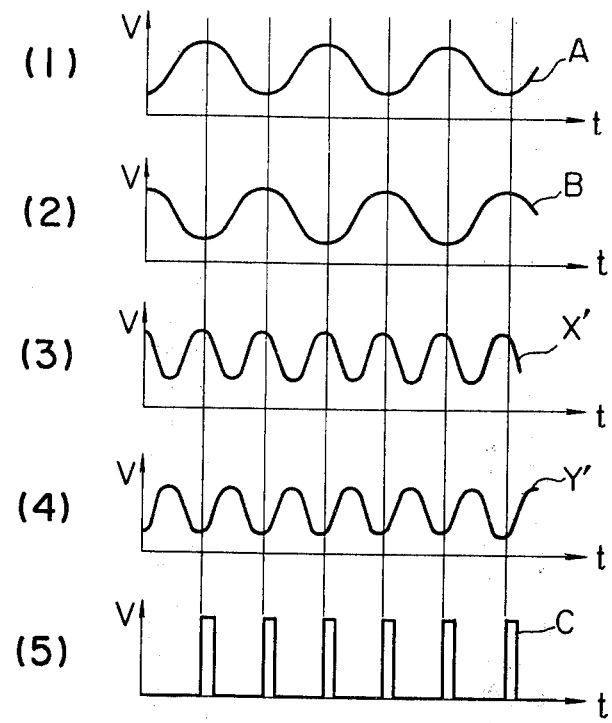
FIG. 2 is a set of waveform charts useful to explain the operation of the apparatus according to the present invention.
Figure 3:
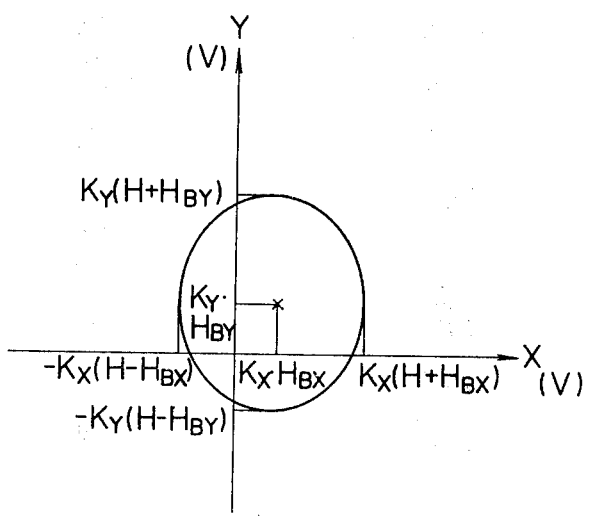
FIG. 3 and FIG. 4 are illustrations useful to explain the principle of operation of the apparatus according to the present invention.

The invention will now be described by way of embodiment with reference to the drawings. FIG. 1 is a systematic diagram illustrating an embodiment of the 8-division digital indicating azimuth compass according to the present invention. Reference number 1 denotes an azimuth sensor having an excitation winding 1D and a pair of intersecting output windings 1A and 1B wound on a ferromagnetic core 1C. Reference number 2 denotes an oscillator which generates complementary alternating signals A and B (FIGS. 2(1) and 2(2)) for energizing the excitation winding 1D in a frequency of f. The strength of the magnetic field within the core 1C varies in response to the horizontal component H of the terrestrial magnetism, and the output windings 1A and 1B provide electrical outputs in proportion to the horizontal component of the terrestrial magnetism. The signals are conducted through filters 3A and 3B, and output signals X' and Y' having a major frequency component of 2f are obtained (FIGS. 2(3) and 2(4)). These output signals X' and Y' vary depending on the pointing direction of the azimuth sensor, i.e., the heading of the vehicle equiped with the sensor. When the azimuth sensor 1 is turned in a parallel magnetic field with a horizontal component strength of H, the outputs X' and Y' at a point of signal C (FIG. 2(5)) from a timing circuit 4 are expressed in relation to the rotational angle $\theta$ of the sensor 1 as follows.

$$X' = KX \cdot H \sin\theta + KX \cdot HBX + Vc \quad (KX: \text{constant})$$

$$Y' = KY \cdot H \cos\theta + KY \cdot HBY + Vc \quad (KY: \text{Constant})$$

where HBX and HBY are the X-component and Y-component of the residual magnetism of the azimuth sensor 1, KX and KY are characteristic constants of the output windings 1A and 1B, respectively, and Vc is the reference voltage. When Vc is zero volt, the locus of the above equations forms an ellipse offset from the origin as shown in FIG. 3.

Figure 4:
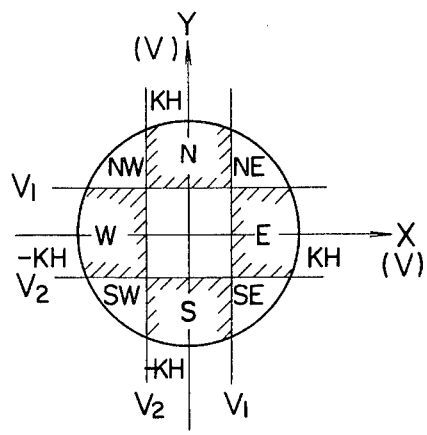

A potentiometer 10E in an adjusting circuit 10 is adjusted to vary the reference voltage 10b for the inverting amplifier constituted by an operational amplifier 10L ($\mu$PC1251, available from NIPPON ELECTRIC CO., LTD) and resistors 10J and 10K, so as to cancel the output KX·HBX induced on the output winding 1A due to the X-component HBX of the residual magnetism HB of the azimuth sensor 1. At the same time, a potentiometer 10B in the adjusting circuit 10 is adjusted to vary the reference voltage 10a for the inverting amplifier constituted by an operational amplifier ($\mu$PC1251, available from NIPPON ELECTRIC CO., LTD) and resistors 10G and 10H, so as to cancel the output KY HBY induced on the output winding 1B due to the Y-component HBY of the residual magnetism HB. By cancelling the effect of the residual magnetism HB of the azimuth sensor 1 with the adjusting circuit 10, and by adjusting the resistors 10G and 10J, or 10H and 10K so that the outputs X and Y have the equal maximum value, the outputs X and Y from the adjusting circuit 10 at the point of signal C (FIG. 2(5)) from the timing circuit 4 are expressed in relation to the rotational angle $\theta$ of the azimuth sensor 1 as follows.

$$X = K \cdot H \sin\theta + Vc$$

$$Y = K \cdot H \cos\theta + Vc$$

where K is a constant. The locus of the above equations, with Vc being set to zero volt, becomes a circle with its center located at the origin, and the radius (kH: in volts, where k is a constant) being proportional to the horizontal component strength H of the terrestrial magnetism (H is a regional value, and is virtually constant within a definite region) as shown in FIG. 4. In operating the adjusting circuit 10, the azimuth sensor 1 is first oriented so that the axis of the output winding 1A coincides with the direction of the magnetic field H, then the potentiometer 10B in the adjusting circuit 10 is adjusted. When the output KY, HBY on the output winding 1B due to the Y-component of the residual magnetism HB has been cancelled down to a range of the voltage error component (VH—VL), a light emitting diode 11J in an indicating circuit 11 will light. Subsequently, the azimuth sensor 1 is oriented so that the axis of the output winding 1B coincides with the direction of the magnetic field H, then the potentiometer 10E in the adjusting circuit 10 is adjusted. When the output KX HBX on the output winding 1A due to the X-component HBX of the residual magnetism HB has been cancelled down to a range of the voltage error component (VH—VL), a light emitting diode 11I in the indicating circuit 11 will light. Thus completion of the adjustment that the locus of the outputs X' and Y' at the point of the signal C (FIG. 2(5)) from the timing circuit 4 forms a circle with its center located at the origin within a range of voltage error (VH—VL) is indicated by the light emitting diodes 11I and 11J in the indicating circuit 11.

Figure 5:
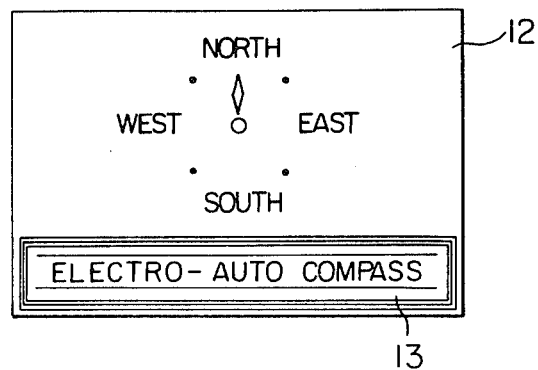
FIG. 5 and FIG. 6 are external views of the apparatus according to the present invention.
Figure 6:
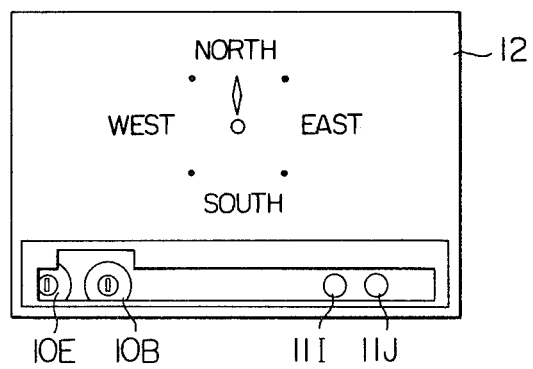

In the circuit arrangement of the azimuth compass according to the present invention, the potentiometers 10B and 10E in the adjusting circuit 10 and the light emitting diodes 11I and 11J in the indicating circuit 11 can be placed in the neighborhood of a display unit 8. In FIG. 5, the potentiometers 10B and 10E, and the light emitting diodes 11I and 11J are located behind an ornamental panel 13, thereby allowing access to these components for adjustment by removing the ornament panel 13 from a front panel 12 as shown in FIG. 6 while the apparatus is kept fixed on the vehicle.

Figure 7A:
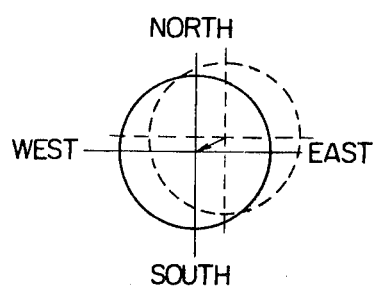
FIGS. 7a–7e are illustrations explaining the adjustment of the origin.
Figure 7B:
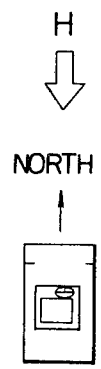
Figure 7C:
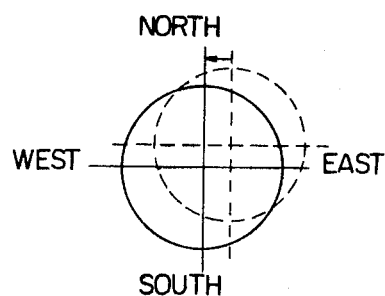
Figure 7D:
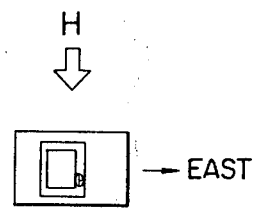
Figure 7E:
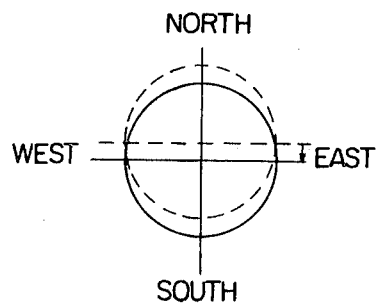

In operating the apparatus for adjustment, when the actual circle shown by the dashed line in FIG. 7a deviates from the normal circle shown by the solid line by the amount shown by the arrow, the vehicle is first headed for north as shown in FIG. 7b and foregoing adjustment is made for the apparatus so as to shift the actual circle in the direction shown by the arrow in FIG. 7c. Subsequently, the vehicle is headed for east as shown in FIG. 7d and the adjustment is made so as to shift the circle in the direction shown by the arrow in FIG. 7e. Thus, the actual circle coincides with the normal circle, completing the circle as shown in FIG. 4.

Considering the 8-division digital indication, one segment of direction covers 45°, and the comparison voltages V1 and V2 are given as:

$$V1 = K \sin 22.5° = 0.3827 \, KH \, (VOLT)$$

$$V2 = K \sin 22.5° = 0.3827 \, KH \, (VOLT)$$

The signals from the output windings 1A and 1B are amplified, and sliced into three signal levels. In FIG. 1, a comparator pair 6A and 6B and a comparator pair 6C and 6D ($\mu$PC177, available from NIPPON ELECTRIC CO., LTD) compare the output of a hold circuit 5A and the output of a hold circuit 6A with the comparison voltages V1 and V2, respectively. As a result, the comparator outputs at points 6a, 6b, 6c and 6d are uniquely expressed in relation to the vehicle heading direction as follows:

| Y X | 6c | 0 | 0 | 1 | 1 |
|---|---|---|---|---|---|
| 6a | 6d 6b | 0 | 1 | 0 | 1 |
| 0 | 0 | SW | W |  | NW |
| 0 | 1 | S |  |  | N |
| 1 | 0 |  |  |  |  |
| 1 | 1 | SE | E |  | NE |

For example, if the signals at points 6a, 6b and 6d are at level "1" and the signal at point 6c is at level "0", the vehicle heading direction is determined as east (E). The outputs from the comparators 6A, 6B, 6C and 6D are processed in a logic circuit 7, and the vehicle heading direction is displayed in digital on the display unit 8.

Although 8-division digital indication has been described, it is obvious that 4N-division (N=1, 2, . . . ) digital indication is achieved by comparing the outputs of the hold circuits 5A and 5B with certain N levels of voltages. The display unit 8 has a digital indicator made up of fluorescent display tubes, lamps, LEDs, and the like, and it also can display symbols.

As described above, the present invention advantageously provides an azimuth determining apparatus having an azimuth sensor which is equipped on a moving body and adapted to determine the heading direction relative to the terrestrial magnetism in two divided intersecting components and a circuit which compares the two-component detection signals from the azimuth sensor with two reference voltages respectively so as to designate the vehicle heading direction, wherein there are further provided an adjusting circuit for varying the two-component detection signal relative to the two reference voltages and an indicating circuit for indicating the amount of deviation of the two-component detection signals from the pointing direction of the azimuth sensor relative to the two reference voltages adjusted by the adjusting circuit, and the two-component detection signals are adjusted by the adjusting circuit such that the deviation of the two-component detection signals of the azimuth sensor from the pointing direction of the sensor as indicated by the indicating circuit is nullified, whereby distortion of the output due to the residual magnetism of the azimuth sensor is corrected and the true azimuth can be determined.

We claim:

1. An azimuth determining apparatus including an azimuth sensor provided on a moving body for sensing a direction of said moving body relative to earth's magnetism to produce two direction component signals crossed at the right angles and means for comparing the two direction component signals from said azimuth sensor with two reference signals, respectively, to display a moving direction of said body, the apparatus comprising:

an adjusting circuit including a first inverting amplifier having a non-inverting input receiving a reference signal from first adjusting means and an inverting input receiving one of said detection signals from said azimuth sensor, and a second amplifier having a non-inverting input receiving a reference signal from inverting second adjusting means and an inverting input receiving the other detection signal from said azmuth sensor; and an indicating circuit including a first comparator having an inverting input receiving the output signal from said first inverting amplifier and a non-inverting input receiving a first predetermined reference signal, a second comparator having an inverting input receiving a second predetermined reference signal and a non-inverting input receiving the output signal from said first inverting amplifier, a third comparator having an inverting input receiving the output signal from said second inverting amplifier and a non-inverting input receiving said first predetermined reference signal, a fourth comparator having an inverting input receiving said second predetermined reference signal and a non-inverting input receiving the output signal from said second inverting amplifier, first light emitting means responsive to the output signals of said first and second comparators for indicating correct adjustment of said one direction component, and second light emitting means responsive to the output signals of said third and fourth comparators for indicating correct adjustment of said other direction component.

2. An azimuth determining apparatus according to claim 1, wherein said first and second light emitting means include light emitting diodes disposed on the same plane as that of an azimuth display panel and covered normally with a cover.

* * * * *